United States Patent Office 3,223,658
Patented Dec. 14, 1965

3,223,658
STABLE AQUEOUS ALKYD RESIN EMULSIONS
William M. Kraft, Verona, and Joseph Weisfeld, Newark, N.J., assignors, by mesne assignments, to Tenneco Chemicals, Inc., a corporation of Delaware
No Drawing. Filed July 21, 1958, Ser. No. 749,628
10 Claims. (Cl. 260—22)

This invention relates to the preparation of surface-coating compositions. More particularly it relates to the preparation of water-based alkyd resin compositions and to the resulting products.

Alkyl resins, which are polymeric esters resulting from the condensation of a polyhydric alcohol with a polybasic acid and a monobasic acid, are widely used in the manufacture of decorative, protective, and functional surface coating compositions. While alkyd resins in general are characterized by good drying qualities, outdoor durability, and resistance to water and to alkalis, the properties of a particular alkyd resin are dependent to a large extent upon the ratios of reactants used in its preparation. An alkyd resin which contains a relatively large amount of polybasic acid is classified as a short oil resin and is characterized by fast-drying to hard, durable films, while an alkyd resin which contains a relatively small amount of polybasic acid is classified as a long oil resin and dries more slowly to soft, flexible films. Medium oil alkyds have properties lying between those of the short oil and the long oil alkyds.

Because they are immiscible with water alkyd resins are generally used in surface-coating applications as solvent-based systems. Such systems dry by a two-step procedure in which the solvent first evaporates and then the alkyd resin polymerizes to a dry, continuous film. Although it provides satisfactory films, the use of such a procedure has a number of disadvantages. The use of such solvents as mineral spirits, toluene, or xylene is costly and results in flammability and toxicity hazards. Clean-up after the application of solvent-based materials is often time-consuming. In addition such materials cannot be applied to damp surfaces.

For these and other reasons it is desirable that alkyd resins be used as water-based coating compositions. Aqueous emulsions have been prepared in the past from various long oil alkyd resins. Short oil and medium oil alkyd resins on the other hand have not previously been used in water-based coating compositions because they are difficult to emulsify and because the resin particles in the emulsions formed have a tendency to coalesce thus resulting in an unstable product. The reactivity of these resins with other components of the system to form water-soluble salts also adds to the difficulties encountered in the production of stable aqueous emulsions from short oil and medium oil alkyd resins.

It is the object of this invention to prepare stable aqueous emulsions from short oil and medium oil alkyd resins. It is the further object of this invention to prepare from these stable emulsions surface-coating compositions that have properties equivalent to those of solvent-based compositions made from the same alkyd resins.

It has been found that when aqueous alkyd resin emulsions are produced from certain short oil and medium oil alkyd resins in accordance with a novel procedure the resulting emulsions are stable and can be used to form surface-coating compositions that have excellent film properties. As compared with solvent-based systems containing the same alkyd resin, such emulsions are less costly to prepare, are free from the hazards of flammability and solvent toxicity, present no odor problems, result in easy cleanup after use, are compatible with most color systems, and can be applied over damp surfaces. As compared with other water-based surface coating compositions, for example, those containing vinyl latices, these stable alkyd resin emulsions have greater durability, better adhesion, higher gloss, and greater pigment-loading capacity.

The present novel process involves heating a short oil or medium alkyd resin with an emulsifying agent and then with good agitation slowly adding an aqueous phase containing an emulsifying agent to form a water-in-oil emulsion. The addition of the aqueous phase is contained so as to bring about inversion of the phases, that is, to convert the water-in-oil emulsion to an oil-in-water emulsion. The resulting emulsion may then be diluted, pigmented, or treated in other ways to form surface-coating compositions. The emulsions produced in this manner differ materially from those produced by known emulsification procedures in that they are extremely stable and can be combined with other ingredients of surface-coating compositions to form products from which can be prepared uniform, continuous films which have drying, durability, and other properties that are comparable to those of the same alkyd resin applied as a solvent-based system.

While we do not wish to be limited to any particular theory, we believe that the improved stability and film characteristics of these alkyd resin emulsions are in part the result of forming first a water-in-oil emulsion and then proceeding through a phase inversion to the desired oil-in-water emulsion. The phase inversion appears to bring about better homogenization of the resin phase, that is, to form emulsions containing smaller particles of the disperse phase than are obtainable by other emulsification procedures. This effect results in improved emulsion stability, minimized foaming during processing, and formation of more uniform films of the resin. The presence of emulsifying agent in both the resin and aqueous phases also improves the stability of the product.

While it can be used to emulsify any alkyd resin, this novel procedure is of special value in the emulsification of certain alkyd resins which cannot emulsified satisfactorily by other procedures. These resins are short oil and medium oil alkyd resins prepared from a polybasic acid, a monobasic acid and a trihydric alcohol having a neopentyl structure or a mixture of polyhydric alcohols including at least one polyhydric alcohol which has a neopentyl structure, the mixture having a functionality of 2.3 to 3.5, that is, an average of 2.3 to 3.5 hydroxyl groups per mole available for esterification. The three components of the alkyd resin, namely the polyhydric alcohol, polybasic acid, and monobasic acid, may be used in varying proportions depending upon the properties desired and upon the particular materials used. It is to be understood that the proportions are based on molar ratios and are expressed as moles of acid per mole of polyhydric alcohol. In describing the relative amounts of reactants it is considered that all of the acid enters into the esterification reaction and that amount of polyhydric alcohol used in the reaction is approximately 5% to 20% in excess of the stoichiometric amount required to react with all of the acid.

The mole ratio of polybasic acid to polyhydric alcohol depends upon both the polyhydric alcohol used and the polybasic acid used. Although dibasic acids are most often used, it is to be understood that when an acid of greater functionality is used, smaller amounts are required. For example, 50% less tribasic acid than dibasic acid is used. In the preparation of the medium oil and short oil alkyd resins of this invention the amount of dibasic acid required for each mole of polyhydric alcohol lies between 0.60 mole and 1.2 moles. For convenience it can be considered that the medium oil alkyd resins of this invention are those in which 0.60 mole to 0.80 mole of polybasic acid is used per mole of polyhydric alcohol and that the short oil alkyd resins are those in which 0.80 mole to 1.2 moles of polybasic acid is used per mole of polyhydric alcohol.

The amount of monobasic acid employed depends upon the functionality of the polyhydric alcohol and upon the amount and functionality of the polybasic acid. In general the amount of the monobasic acid used is that amount which is necessary to complete the esterification of the polyhydric alcohol. In the present process the medium oil alkyd resins contain 0.60 mole to 1.0 mole of monobasic acid per mole of polyhydric alcohol; the short oil alkyd resins contain 0.25 mole to 0.6 mole of monobasic acid per mole of polyhydric alcohol.

The polyhydric alcohols used in the preparation of the alkyd resins of this invention are trihydric alcohols having a neopentyl structure or mixtures of polyhydric alcohols which include at least one polyhydric alcohol that has a neopentyl structure and which have a functionality of 2.3 to 3.5, that is, an average of 2.3 to 3.5 hydroxyl groups per mole. It has been found that in order to obtain the advantages of this invention at least one neopentyl polyhydric alcohol must be used in the preparation of the alkyd resin. By neopentyl polyhydric alcohol we mean a compound having the structure

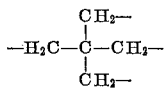

in which at least two of the methylene groups are attached to hydroxyl groups and any remaining methylene groups to alkyl groups or to hydrogen atoms. Among the neopentyl polyhydric alcohols we prefer to use are trimethylolethane,

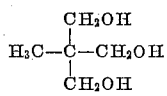

trimethylolpropane,

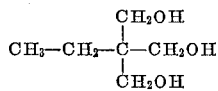

and trimethylolbutane,

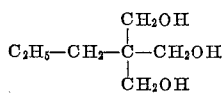

In place of these trihydric neopentyl alcohols we may use a mixture of polyhydric alcohols that includes at least one neopentyl polyhydric alcohol and that has a functionality of 2.3 to 3.5. For example, we may use mixtures of pentaerythritol and ethylene glycol which contain from 0.3 to 5 moles of ethylene glycol per mole of pentaerythritol. Other useful mixtures include pentaerythritol and propylene glycol, trimethylolethane and ethylene glycol, and pentaerythritol, trimethylolethane, and ethylene glycol. It is necessary that the mixture of polyhydric alcohols employed have a functionality of at least 2.3, since a resin prepared from a polyhydric alcohol mixture of lower functionality has relatively little cross-linking in its molecule and does not form satisfactory films. When a mixture of polyhydric alcohols having a functionality greater than 3.5 is used in the preparation of short oil alkyd resins, gelation generally occurs before the esterification has been completed.

The polybasic acids which may be used in the preparation of these short oil and medium oil alkyd resins are the aliphatic and aromatic dibasic acids and tribasic acids. Among the aliphatic acids that can be used are those in which the alkyl group contains from 1 to 34 carbon atoms. This alkyl group may be saturated or unsaturated and may have a straight, branched, or cyclized chain. When a dibasic aromatic acid is used, the ring or rings may contain substituents other than hydrogen on the nuclear carbon atoms. Illustrative of the polybasic acids that may be used are the following: maleic acid, fumaric acid, citric acid, aconitic acid, benzene tricarboxylic acid, sebacic acid, adipic acid, dimerized fatty acids, phthalic acid, terephthalic acid, isophthalic acid, chlorophthalic acid, naphthalene-1,5-dicarboxylic acid, and methylene-bisbenzoic acid. Mixtures of these acids can be used. In general the anhydrides of the acids can be used in place of the acids. Accordingly, the term "acid" as used herein includes the anhydride unless clearly stated otherwise.

Any of the monocarboxylic acids commonly used in the production of alkyd resins may be used to form the medium oil and short oil alkyd resins of this invention. These include the aliphatic straight or branched chain acids, saturated or unsaturated, containing 4 to 22 carbon atoms. Illustrative of these acids are butyric acid, caproic acid, caprylic acid, 2-ethylhexoic acid, lauric acid, myristic acid, oleic acid, methacrylic acid, crotonic acid, sorbic acid, linoleic acid, stearic acid, abietic acid, and phenylacetic acid. Drying oil fatty acids and semi-drying oil fatty acids, which are mixtures of such acids, may also be used. These include tall oil fatty acids, soybean oil fatty acids, and linseed oil fatty acids. Mononuclear aromatic acids, such as salicylic acid, benzoic acid, chlorobenzoic acids, toluic acid, and p-t-butylbenzoic acid, may also be used. A single monobasic acid or a mixture of these acids may be used.

Any of the known procedures for the preparation of alkyd resins may be used. These include the fusion procedure in which a mixture of the reactants is heated until esterification is complete and the solvent process in which xylene or another solvent is used to assist in the removal of the water of esterification and in the maintenance of the reaction temperature. A process described in detail in Wililam M. Kraft's copending application Serial No. 637,625, filed February 1, 1957, now U.S. Patent No. 2,973,331, yields resins having exceptionally good drying and film characteristics. In this process the polyhydric alcohol is esterified with the dibasic acid and a portion of the monobasic acid to an acid number below 10 and the resulting resin is then reacted with the remainder of the monobasic acid to form an alkyd resin having an acid number below 10.

The properties of the alkyd resins are dependent to some extent upon the procedure used in their production, but in general any alkyd resin having the specified composition can be used in the preparation of stable emulsions provided that the reaction is continued until the product has an acid number of less than 35 mg. KOH per gram and preferably less than 10. The presence of more than this amount of free acid in the alkyd resin has an adverse effect on the stability of the resulting emulsion.

The emulsification of the alkyd resins is carried out by heating the alkyd resin to a temperature between 50° and 100° C., adding to it an emulsifying agent, and while stirring vigorously adding slowly an aqueous phase so as to form a water-in-oil emulsion. The slow addition of the aqueous phase is continued until inversion, that is, phase reversal, occurs. At this time the water-in-oil emulsion becomes an oil-in-water emulsion. The aqueous phase is added at a more rapid rate to bring the resin content to the desired level, and the emulsion is cooled to room temperature. It may then be screened to remove large particles of resin. The emulsion may be used as obtained or it may be diluted to 50% resin soilds and have stabilizers, pigments, or other materials added to it.

Before the addition of the aqueous phase is begun the alkyd resin is heated to a temperature of 50° to 100° C., with 85° to 95° C. the preferred range. This heating effectively reduces the viscosity of the resin and of the resulting emulsion and thereby facilitaties dispersion of the aqueous phase. The amount of the aqueous phase that can be added before inversion occurs is largely dependent upon temperature, with higher temperatures in the specified range allowing the addition of more of the aqueous phase before inversion. It appears that the stability of the emulsions is related to the amount of aqueous phase added before inversion and that the most desirable products are those obtained when inversion occurs in a system that contains 50% to 85% of resin solids.

The aqueous phase is added to the resin phase at a rate that allows for good dispersion of the aqueous phase in the resin. After inversion the addition may be more rapid.

Vigorous agitation of the emulsion is necessary during the addition of the aqueous phase. A convenient apparatus is a 4-bladed propeller whose speed of rotation can be changed during the emulsification. To achieve further homogenization the emulsion can then be passed through any known emulsification apparatus, for example, a colloid mill or an ultrasonic homogenizer.

Emulsions of good stabliity are obtained when the emulsifying agents used in their preparation are those of the nonionic type. Cationic emulsifying agents are unsatisfactory because they react with the metallic driers that are added to the alkyd resin thereby reducing the effectiveness of the driers as well as affecting the clarity of the alkyd resin film. The use of anionic emulsifying agents often results in excessive foaming during the emulsification step.

We prefer to use a mixture of nonionic emulsifying agents in the preparation of stable emulsions from short oil and medium oil alkyd resins. The mixture includes a water-soluble emusifying agent and an oil-soluble emulsifying agent which are mutually soluble. While any combination of nonionic emulsifying agents that meet the above requirements can be used, we prefer to use pairs of nonionic emusifying agents that are related structurally. For example, certain alcohols and esters react with ethylene oxide to yield series of products whose solubilities are dependent upon the ratio of reactants employed, with an increase in the ethylene oxide content resulting in a corresponding increase in the water solubility and decrease in the oil solubility of the product. Among the pairs of emulsifying agents that have proven useful in the preparation of stable alkyd resin emulsions are the following:

Igepal CO–880, a water-soluble nonyl phenoxy polyoxyethylene ethanol, and Igepal CO–430, an oil-soluble nonyl phenoxy polyoxyethylene ethanol, which are marketed by Antara Chemicals Co.; Tween 20, a water-soluble polyoxyethylene sorbitan monolaurate and, Span 80, an oil-soluble sorbitan monooleate, both of which are products of Atlas Powder Co.; Tergitol NPX, a water-soluble alkyl phenyl polyethylene glycol ether, and Tergitol NP–14, an oil-soluble alkyl phenyl polyethylene glycol ether, both of which are sold by Union Carbide Chemicals Co.; and Pluronic L–61, an oil-soluble polyoxypropylene, and Pluronic F–68, a water-soluble polyoxypropylene, which are sold by Wyandotte Chemicals Corp. The ratio of emulsifying agents in the mixture generally lies between 0.15 and 6 parts of the oil-soluble emulsifying agent per part of water-soluble emulsifying agent, with a ratio of approximately 2 to 1 preferred.

The amount of the mixture of emulsifying agents that is used in the preparation of stable alkyd resin emulsions is between 1% and 4% based on the weight of the alkyd resin, with best results obtained with approximately 2%. The presence of less than 1% of emulsifying agent results in the formation of relatively unstable emulsions; the presence of more than approximately 4% of emulsifying agent tends to produce softer resin films but does not improve the stability of the emulsion.

The mixture of emulsifying agents may be added to the alkyd resin before the addition of the aqueous phase is begun. Such a procedure yields a relatively stable emulsion. We have found, however, that best results are obtained when approximately half of the mixture is added to the resin and the other half to the aqueous phase. Thus we prefer to add approximately 1% based on the weight of the resin of a mixture of emulsifying agents to the alkyd resin and the same amount to the aqueous phase in order to obtain stable short-oil alkyd resin emulsions.

The aqueous phase that is added to the alkyd resin phase usually contains in addition to water and emulsifier approximately 0.6% to 1.5% based on the weight of the alkyd resin of a volatile nitrogen-containing compound. This amount is somewhat greater than that required to neutralize the free acids in the alkyd resin. The presence of such a compound increases the stability of the emulsion without increasing the water sensitivity of the dried film, since the compound evaporates as the film dries. Among the volatile, nitrogen-containing compounds that may be used are ammonium hydroxide, pyridine, 3-methoxypropylamine, morpholine, and related compounds.

A small amount, up to approximately 2%, of a protective colloid such as a salt of a polyacrylic acid may be added to the alkyd resin emulsion to improve its stability. The presence of such a material may improve the hardness and other properties of films prepared from the emulsions.

The driers used in combination with the alkyd resin emulsions of this invention are preferably emulsified metallic soaps; for example, emulsified lead, cobalt, and manganese naphthenates. We prefer to add these driers to the water-in-oil emulsion before inversion has occured. When the driers are added to the completed emulsion, an excessively long time is required for thorough drying of the resin films, probably because the film of emulsifier prevents intimate contact between the catalyst and the resin. The addition of driers to the alkyd resin at the start of emulsification is avoided because at the elevated temperatures employed during emulsification undue polymerization of the resin may occur.

*Example 1*

A short-oil alkyd resin was prepared by the following procedure: A mixture of 843.5 grams (7 moles) of trimethylolethane, 1036 grams (7 moles) of phthalic anhydride, 1211 grams (4.2 moles) of tall oil fatty acids, and 147 grams of xylene was heated with stirring at 245° C. until its acid number was below 10. The xylene was removed from the resin by distillation.

*Example 2*

A medium oil alkyd resin was prepared by heating together 778 grams (2.8 moles) of soybean oil fatty acids, 179 grams (1.5 moles) of benzoic acid, 867 grams (5.8 moles) of phthalic anhydride, 676 grams (5.6 moles) of trimethylolethane, and 115 grams of xylene with stirring at 245° C. until the acid number of the product was below 10. The solvent was then removed from the resin by distillation.

*Example 3*

A medium oil pentaerythritol-ethylene glycol alkyd resin was prepared by heating a mixture of 444 grams (3 moles) of phthalic anhydride and 186 grams (3 moles) of ethylene glycol at 150° C. for 30 minutes and then after the addition of 444 grams (3 moles) of phthalic anhydride 435 grams (3 moles) of technical pentaerythritol, 1386 grams (4.8 moles) of tall oil fatty acids, and 136 grams of xylene heating the mixture at 190° C. for one hour and then at 245° C. until an acid number of less than 10 was reached. The xylene was distilled away from the alkyd resin.

*Example 4*

Emulsions were prepared by the following procedure from the alkyd resins whose preparation has been described in Examples 1, 2, and 3.

Four hundred grams of the alkyd resin was heated to 120° C. Then 1.33 grams of Igepal CO–880, a water-soluble nonyl phenoxy polyethylene ethanol, and 2.67 grams of Igepal CO–430, an oil-soluble nonyl phenoxy polyethylene ethanol, were added, and the mixture was stirred at 300–400 r.p.m. with a 4-bladed propeller until its temperature had fallen to 90°–100° C. The propeller speed was increased to 1800–2000 r.p.m. An aqueous phase consisting of 400 grams of water, 4 grams of 28% ammonium hydroxide, 1.33 grams of Igepal CO–880, and 2.67 grams of Iregpal CO–430 was added to the alkyd resin phase at the rate of 3 to 5 ml. per minute. During the addition the temperature was maintained at 85°–95° C. As the aqueous phase was added, the viscosity of the resulting water-in-resin emulsion gradually increased. When sufficient water had been added to cause inversion of the phases of the emulsion, the viscosity decreased suddenly, and the product became a thick white cream. After inversion the rate at which the aqueous phase was added was increased to 10 to 15 ml. per minute, and the emulsion was allowed to cool to room temperature. The finished emulsion, which contained 50% of alkyd resin, was poured through a 50-mesh screen to remove from it large resin particles. In each case the emulsion obtained was a thick white cream which separated only slightly on being heated at 50° C. for 5 days and which could be readily rehomogenized by stirring.

*Example 5*

The procedure described in Example 4 was repeated using the alkyd resin of Example 1. This time, however, after the addition of the first 50 ml. of the aqueous phase to the alkyd resin phase, emulsified lead naphthenate containing 0.5% lead based on the weight of alkyd resin, emulsified cobalt naphthenate containing 0.05% cobalt, and emulsified manganese naphthenate containing 0.02% manganese were added. An additional 275 ml. of the aqueous phase was added before inversion occurred. A series of emulsions was prepared in which the total amount of emulsifying agent added varied from 1% to 8% of the weight of the alkyd resin. The emulsifying agent used was a mixture containing two parts of an oil-soluble nonyl phenoxypolyethylene ethanol per part of water-soluble nonyl phenoxy polyethylene ethanol. The emulsions formed were thick white creams, all of which separated slightly in 2.5 days at 60° C. and which could be easily rehomogenized by stirring. Measurements made on dried films of the emulsions indicated that maximum hardness was attained by the film that contained a total of 2% of emulsifying agent.

*Example 6*

A series of tests was made in which the film properties of alkyd emulsions were compared with those of solvent systems prepared from the same alkyd resins.

The emulsions in each case contained 50% of alkyd resin and 2% based on the weight of alkyd resin of emulsifier. The solvent systems contained 60% of alkyd resin in xylene. The results of these tests appear in the table that follows:

| Alkyd Resin preparation described in Example No. | System | Film Properties Air Dried with 0.5% Pb and 0.5% Co (as emulsified metal naphthenates) | | | Baked at 150° C. for 1 hour | | | |
|---|---|---|---|---|---|---|---|---|
| | | Drying Time [a] | | Hardness [b] | Hardness [b] | Water Resistance [c] | | Alkali Resistance [d] |
| | | Set-to-Touch | Foil Dry | | | Hot | Cold | |
| 1 | Emulsion | 0:14 | 30: | 10 | 16 | Sl. 0:10 | Sl. 0:25 | 36: |
| 1 | Solvent | 0:11 | 31: | 10 | 18 | V. Sl. 0:15 | No effect | |
| 1 | Stabilized Emulsion [e] | 0:11 | 22: | 18 | 20 | Some 0:30 | Cons. 1:30 | 215 |
| 2 | Emulsion | | | | 30 | Sl. 0:30 | Some 0:30 | |
| 2 | Solvent | | | | 30 | V. Sl. 0:30 | No effect | |
| 3 | Emulsion | 0:35 | 32: | 10 | 10 | Sl. 0:25 | V. Sl. 0:05 | |
| 3 | Solvent | 0:15 | 32: | 10 | 8 | V. Sl. 0:10 | No effect | |

[a] Films were set-to-touch when no mark was left by a finger brushing across the film with minimum pressure. Foil-dry, which indicates through drying, was obtained when a piece of aluminum foil left no tack on the film after a 20 gram weight had been placed on it for 10 seconds.
[b] The Sward Hardness Rocker was used to measure hardness of the films. The hardness of glass has been given a rating of 100.
[c] Hot and cold water resistances were determined by immersing baked films on tin panels in water at 100° C. for 15 minutes or in water at room temperature for 16 hours. The degree of whitening of the film and the time required for the film to recover its original appearance were noted. Sl. indicates slight; V. Sl. very slight; and Cons., considerable whitening during immersion in water. No effect indicates that the film appearance was unchanged by this treatment.
[d] Alkali resistance was determined by immersing 25 x 100 mm. test tubes coated with the film in 3% NaOH solution at room temperature and noting the time at which the film deteriorated.
[e] This emulsion contains 1% of an ammonium salt of a polyacrylic acid based on the weight of alkyd resin solids.

We claim:
1. A stable aqueous emulsion having as its disperse phase an alkyd resin which is the reaction product of a polyhydric alcohol selected from the group consisting of trihydric neopentyl alcohols, mixtures of neopentyl trihydric alcohols and lower alkylene glycols, and mixtures of neopentyl tetrahydric alcohols and lower alkylene glycols, wherein said lower alkylene glycols are members selected from the group consisting of ethylene glycol, propylene glycol, and mixtures thereof, said polyhydric alcohol containing an average of 2.3 to 3.5 hydroxyl groups per molecule, with a polybasic acid selected from the group consisting of aliphatic dicarboxylic acids containing from 3 to 36 carbon atoms per molecule, phthalic acids, the anhydrides of said acids, and mixtures thereof and a monobasic acid selected from the group consisting of aliphatic monocarboxylic acids containing from 4 to 22 carbon atoms per molecule, benzoic acid, alkylbenzoic acids wherein the alkyl group contains from 1 to 4 carbon atoms, chlorobenzoic acids, salicylic acid, and mixtures thereof, said polybasic acid being present in the amount of 0.6 to 1.2 moles per mole of polyhydric alcohol and said monobasic acid in the amount of 0.25 to 1.0 mole per mole of polyhydric alcohol and which has an acid number of less than 35.

2. The stable aqueous emulsion described in claim 1 wherein the polyhydric alcohol used in the preparation of the alkyd resin is trimethylolethane.

3. The stable aqueous emulsion described in claim 1 wherein the polyhydric alcohol used in the preparation of the alkyd resin is trimethylolpropane.

4. The stable aqueous emulsion described in claim 1 wherein the polyhydric alcohol used in the preparation of the alkyd resin is a mixture of pentaerythritol and ethylene glycol containing from 0.3 to 5 moles of ethylene glycol per mole of pentaerythritol.

5. The stable aqueous emulsion having as its disperse phase an alkyd resin which is the reaction product of a polyhydric alcohol selected from the group consisting of trihydric neopentyl alcohols, mixtures of neopentyl trihydric alcohol and lower alkylene glycols, and mixtures of neopentyl tetrahydric alcohols and lower alkylene glycols, wherein said lower alkylene glycols are members selected from the group consisting of ethylene glycol, propylene glycol, and mixtures thereof, said polyhydric alcohol containing an average of 2.3 to 3.5 hydroxyl groups per molecule, with phthalic anhydride and a monobasic acid selected from the group consisting of aliphatic monocarboxylic acids containing from 4 to 22 carbon atoms per molecule benzoic acid, alkylbenzoic acids wherein the alkyl group contains from 1 to 4 carbon atoms, chlorobenzoic acids, alicylic acid, and mixtures thereof, said phthalic anhydride being present in the amount of 0.8 to 1.2 moles per mole of polyhydric alcohol and the monobasic acid in the amount of 0.25 to 0.6 mole per mole of polyhydric alcohol and which has an acid number of less than 35 mg. KOH/gram.

6. The stable aqueous emulsion described in claim 5 wherein the polyhydric alcohol used in the preparation of the alkyd resin is trimethylolethane.

7. The stable aqueous emulsion described in claim 5 wherein the polyhydric alcohol used in the preparation of the alkyd resin is a mixture of pentaerythritol and ethylene glycol containing 0.3 to 5 moles of ethylene glycol per mole of pentaerythritol.

8. The coating composition comprising pigment and a stable aqueous alkyd resin emulsion having as its disperse phase an alkyd resin which is the reaction product of a polyhydric alcohol selected from the group consisting of trihydric neopentyl alcohols mixtures of neopentyl trihydric alcohols and lower alkylene glycols, and mixtures of neopentyl tetrahydric alcohols and lower alkylene glycols, wherein said lower alkylene glycols are members selected from the group consisting of ethylene glycol, propylene glycol, and mixtures thereof, said polyhydric alcohol containing an average of 2.3 to 3.5 hydroxyl groups per molecule with phthalic anhydride and a monobasic acid selected from the group consisting of aliphatic monocarboxylic acids containing from 4 to 22 carbon atoms per molecule, benzoic acid, alkylbenzoic acids wherein the alkyl group contains from 1 to 4 carbon atoms, chlorobenzoic acids, salicylic acid, and mixtures thereof, said phthalic anhydride being present in the amount of 0.6 to 1.2 moles per mole of polyhydric alcohol and said monobasic acid in the amount of 0.25 to 1.0 mole per mole of polyhydric alcohol and which has an acid number of less than 35, said emulsion containing 1 to 2% based on the weight of the alkyd resin of a salt of a polyacrylic acid.

9. The coating composition described in claim 8 wherein the polyhydric alcohol used in the preparation of the alkyd resin is trimethylolethane.

10. The coating composition described in claim 8 wherein the polyhydric alcohol used in the preparation of the alkyd resin is a mixture of pentaerythritol and ethylene glycol containing 0.3 to 5 moles of ethylene glycol per mole of pentaerythritol.

References Cited by the Examiner
UNITED STATES PATENTS

| | | | |
|---|---|---|---|
| 2,719,133 | 9/1955 | Smith | 260—22 |
| 2,720,502 | 10/1955 | Caldwell | 260—75 |
| 2,825,708 | 3/1958 | Auer | 260—22 |
| 2,855,373 | 10/1958 | Guenther | 260—850 |
| 2,907,720 | 10/1959 | Auer | 260—6 |
| 3,001,961 | 9/1961 | Armitage et al. | 260—22 |
| 3,035,004 | 5/1962 | Glavis | 260—29.7 |

LEON J. BERCOVITZ, *Primary Examiner.*

DANIEL ARNOLD, ALLEN M. BOETTCHER, ALPHONSO D. SULLIVAN, *Examiners.*